United States Patent

Takizawa et al.

Patent Number: 4,807,981
Date of Patent: Feb. 28, 1989

[54] SPATIAL FREQUENCY FILTER

[75] Inventors: Yoshinori Takizawa, Tokyo; Takahiro Nakamura, Yokohama, both of Japan

[73] Assignee: Kabushiki Kaisha Toshiba, Kawasaki, Japan

[21] Appl. No.: 727,914

[22] Filed: Apr. 26, 1985

[30] Foreign Application Priority Data

Apr. 28, 1984 [JP] Japan ................................. 59-86584
May 17, 1984 [JP] Japan ................................. 59-99612

[51] Int. Cl.$^4$ .......................... G02B 5/30; G02B 27/28
[52] U.S. Cl. ..................................... 350/404; 350/408
[58] Field of Search ............... 350/400, 404, 408, 370, 350/162.12

[56] References Cited

U.S. PATENT DOCUMENTS

| 3,784,734 | 1/1974 | Watanabe et al. | 358/44 X |
| 4,227,208 | 10/1980 | Takanashi et al. | 358/55 |
| 4,539,584 | 9/1985 | Otake | 350/404 |

FOREIGN PATENT DOCUMENTS

| 51-127746 | 4/1975 | Japan . | |
| 52-66449 | 11/1975 | Japan . | |
| 57-10105 | 1/1982 | Japan | 350/394 |
| 59-279 | 1/1984 | Japan . | |
| 59-75222 | 4/1984 | Japan | 350/404 |
| 2088078 | 6/1982 | United Kingdom | 350/394 |

Primary Examiner—John K. Corbin
Assistant Examiner—David J. Edmondson
Attorney, Agent, or Firm—Cushman, Darby & Cushman

[57] ABSTRACT

A spatial frequency filter is adapted to an image sensor having a two-dimensional spatial frequency plane whose first quadrant includes a first prescribed point, whose second quadrant includes a second prescribed point, whose third quadrant includes a third prescribed point and whose fourth quadrant includes a fourth prescribed point. The two-dimensional spatial frequency plane has a vertical axis and a horizontal axis. The spatial frequency filter includes the combination of a primary filter part for providing a first trap line passing through the first prescribed point and a second trap line passing through the third prescribed point, a secondary filter part for providing a third trap line passing through the second prescribed point and a fourth trap line passing through the fourth prescribed point, and a tertiary filter part for providing a fifth trap line passing through the first and fourth prescribed points and a sixth trap line passing through the second and third prescribed points. Each of the first to fourth trap lines crosses over the vertical and horizontal axes. The spatial frequency filter of the present invention so arranged suppresses spurious information along the slant and horizontal (or vertical) axes of the image sensor.

30 Claims, 12 Drawing Sheets

F I G. 1

F I G. 2

F I G. 7
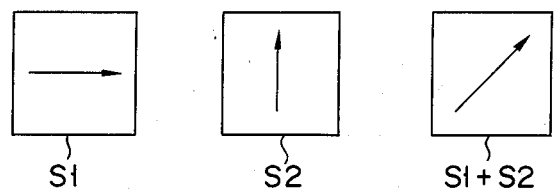
F I G. 8
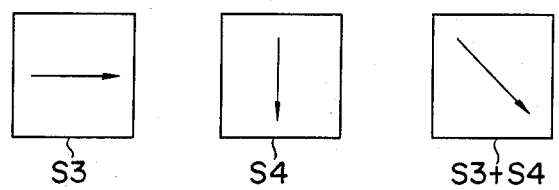
F I G. 9   F I G. 10
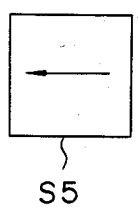 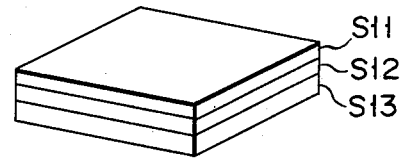
F I G. 11
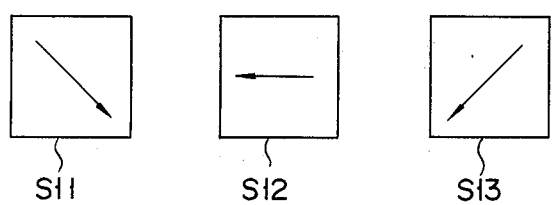

F I G. 15 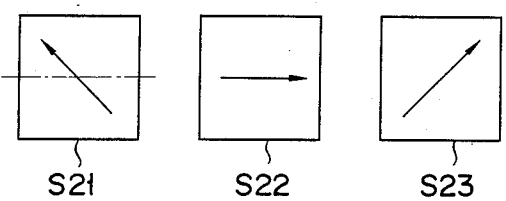
F I G. 16 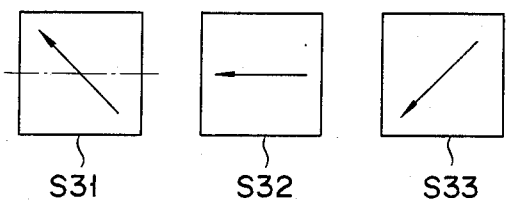
F I G. 17 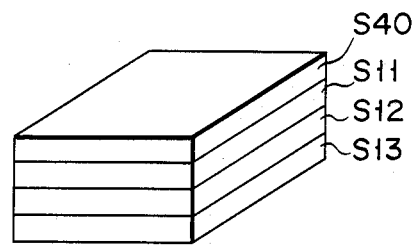
F I G. 18 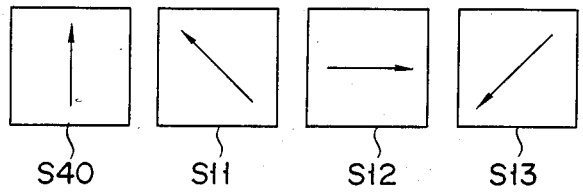
F I G. 19 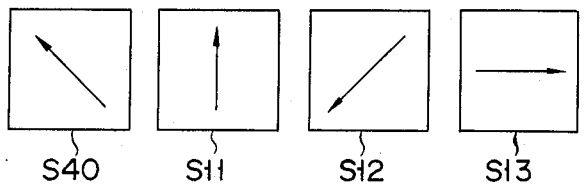

F I G. 20
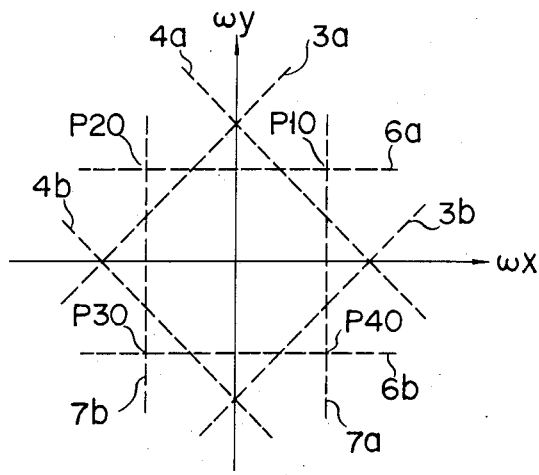
F I G. 21
|   | G  | Cy | G  |   |
|---|----|----|----|---|
|   | G  | Ye | G  |   |
|   | G  | Cy | G  |   |
|   | Ye | G  | Ye |   |
|   | G  | Cy | G  |   |
n { (rows 1-2), n+1 { (rows 3-4), n+2 { (row 5)
n+262, n+263, n+264
F I G. 22
|   | W  | G  | W  |   |
|---|----|----|----|---|
|   | G  | G  | G  |   |
|   | Cy | Ye | Cy |   |
|   | G  | G  | G  |   |
|   | W  | G  | W  |   |
n { (rows 1-2), n+1 { (rows 3-4), n+2 { (row 5)
n+262, n+263, n+264

FIG. 23

|   | W | G | W | G |   |
|---|---|---|---|---|---|
|n| W | G | W | G | |
| | W | G | W | G | n+263 |
|n+1| Ye | Cy | Ye | Cy | |
| | Ye | Cy | Ye | Cy | n+264 |
|n+2| W | G | W | G | |
| | W | G | W | G | n+265 |
|n+3| Ye | Cy | Ye | Cy | |
| | Ye | Cy | Ye | Cy | n+266 |

FIG. 24

|   | W | G | W | G |   |
|---|---|---|---|---|---|
|n| W | G | W | G | |
| | W | G | W | G | n+263 |
|n+1| Cy | Ye | Cy | Ye | |
| | Cy | Ye | Cy | Ye | n+264 |
|n+2| W | G | W | G | |
| | W | G | W | G | n+265 |
|n+3| Cy | Ye | Cy | Ye | |
| | Cy | Ye | Cy | Ye | n+266 |

FIG. 25

|   | W | G | W | G |   |
|---|---|---|---|---|---|
|n| W | G | W | G | |
| | G | W | G | W | n+263 |
|n+1| Ye | Cy | Ye | Cy | |
| | Cy | Ye | Cy | Ye | n+264 |
|n+2| W | G | W | G | |
| | Cy | Ye | Cy | Ye | n+265 |
|n+3| Ye | Cy | Ye | Cy | |
| | Cy | Ye | Cy | Ye | n+266 |

FIG. 26

|   | W | G | W | G |   |
|---|---|---|---|---|---|
|n| W | G | W | G | |
| | G | W | G | W | n+263 |
|n+1| Cy | Ye | Cy | Ye | |
| | Ye | Cy | Ye | Cy | n+264 |
|n+2| W | G | W | G | |
| | G | W | G | W | n+265 |
|n+3| Cy | Ye | Cy | Ye | |
| | Ye | Cy | Ye | Cy | n+266 |

FIG. 27

| n | W | G | W | G |
| --- | --- | --- | --- | --- |
| | Ye | Cy | Ye | Cy | n+263
| n+1 | W | G | W | G |
| | Cy | Ye | Cy | Ye | n+264
| n+2 | W | G | W | G |
| | Ye | Cy | Ye | Cy | n+265
| n+3 | W | G | W | G |
| | Cy | Ye | Cy | Ye | n+266

FIG. 28

| n | Ye | Cy | Ye | Cy |
| --- | --- | --- | --- | --- |
| | W | G | W | G | n+263
| n+1 | Ye | Cy | Ye | Cy |
| | G | W | G | W | n+264
| n+2 | Ye | Cy | Ye | Cy |
| | W | G | W | G | n+265
| n+3 | Ye | Cy | Ye | Cy |
| | G | W | G | W | n+266

FIG. 29

| | | | |
|---|---|---|---|
| n | M | G | (n−1)* |
| | Cy | Ye | n* |
| (n+1) | G | M | |
| | Cy | Ye | (n+1)* |

A FIELD     B FIELD

FIG. 30

| | | | |
|---|---|---|---|
| n | Cy | Ye | (n−1)* |
| | M | G | n* |
| (n+1) | Ye | Cy | |
| | M | G | (n+1)* |

A FIELD     B FIELD

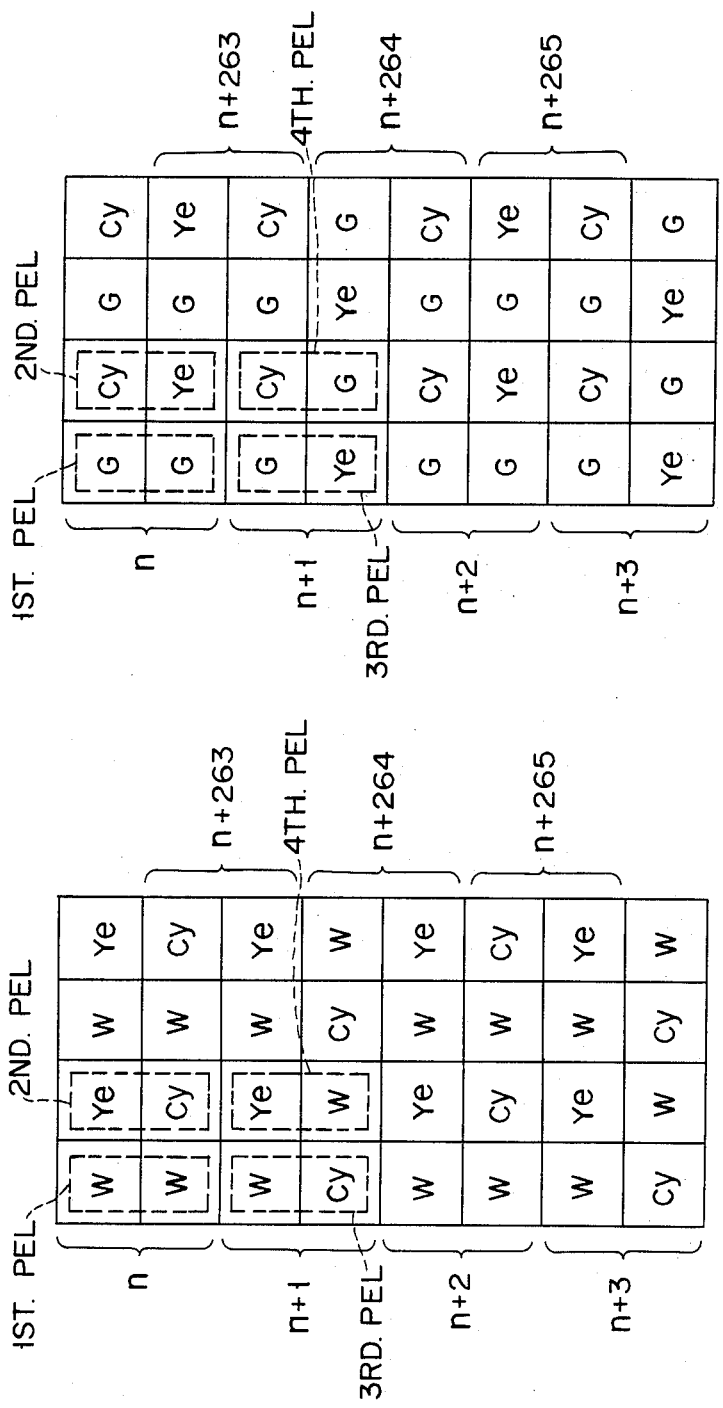

F I G. 36
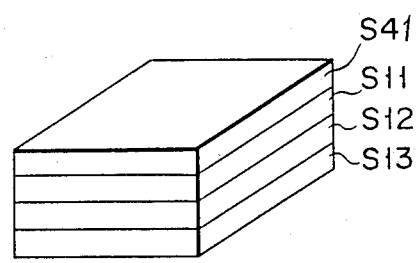

SPATIAL FREQUENCY FILTER

BACKGROUND OF THE INVENTION

The present invention relates to an optical filter formed with birefringent plates, and more particularly relates to a spatial frequency filter for eliminating an alias involved in a two-dimensional solid-state image sensor for a color TV camera.

A two-dimensional solid-state image sensor is widely utilized in various devices such as a TV camera, a fiber scope, etc. Video information is obtained from the image sensor by discrete sampling of spatial information of an optical image. A frequency of the sampling depends on the configuration of an optical system and on the arrangement of apertures of pixels of the image sensor. Such an image sensor is provided with a spatial frequency filter (or optical low pass filter). The modulation transfer function (MTF) of the image sensor is restricted by a Nyquist limit (or Nyquist frequency) which is intrinsic to the individual image sensor. In addition, video information of a high frequency exceeding the Nyquist limit is folded back to the frequency area below the Nyquist limit. This folding back is called "alias" which induces spurious video information and thus degrades the quality of the obtained video information.

In a color TV camera using a single-plate solid-state image sensor, in order to obtain color signals incident light is spatially modulated. Signals obtained by this spatial modulation are processed in a known manner. At this time, information of the incident light having a frequency equal to the spatial modulation frequency involves a color spurious signal.

From this, a spatial frequency filter having a trap corresponding to the spatial modulation frequency is required to reduce the color spurious signal. In this case, however, if the spatial frequency filter has a sharp cutting-off characteristic, a certain amount of residual color spurious signals remains around the trap.

To obtain color signals of three primary colors, it is necessary to produce not only a base band signal for luminance information but also two modulated color signals. These color modulation signals are produced by proper processing of multiplex signals which are obtained by means of a color mosaic filter. In such a color mosaic filter, specific pixels for one color information are arranged in a striped pattern, while other pixels for the other color information are arranged in a checkered pattern. In this case, a color spurious signal due to the striped pixel pattern is caused by the signal having a horizontal spatial frequency of the two dimensional spatial frequency plane, and a color spurious signal due to the checkered pattern is caused by the signal having a slant spatial frequency thereof.

A conventional approach to eliminate the influence of the alias is disclosed in Japanese Patent Disclosure No. 59-279. Assume that Px defines the pixel pitch in the horizontal axis of a two-dimensional solid-state image sensor and Py defines the pixel pitch in the vertical axis thereof. A spatial frequency filter of the above Japanese Patent Disclosure is made of two optical filters, thereby forming traps (null points of MTF=0) of the spatial frequency filter on a line passing through the points (Px/2, Py/2) and (−Px/2, Py/2), on a line passing through the points (Px/2, −Py/2) and (−Px/2, −Py/2), on a line passing through the points (Px/2, Py/2) and (Px/2, −Py/2), and on a line passing through the points (−Px/2, Py/2) and (−Px/2, −Py/2). (In this case, the trap lines form a rectangular figure.) Further, this Japanese Patent Disclosure shows another spatial frequency filter by which traps are formed on slant lines respectively passing through the points (Px/2, Py/2), (−Px/2, Py/2), (−Px/2, −Py/2) and (Px/2, −Py/2). (In this case, the trap lines form a rhombic figure.)

When the spatial frequency filter with the rectangular trap lines is employed, unnecessary video information exceeding the Nyquist limit, to which belongs the slant axis of the X-Y two-dimensional plane of the image sensor, cannot be sufficiently suppressed. Such unnecessary video information could invite spurious signals when a spatial modulation is effected along the slant axis. On the other hand, when the spatial frequency filter with the rhombic trap lines is employed, unnecessary video information of the slant axis can be suppressed. In this case, however, the degree of suppression of spurious video information exceeding the Nyquist limit, to which the horizontal (or vertical) axis of the X-Y image sensor plane belong, is not yet sufficient. According to the prior art spatial frequency filter, the requirement for suppressing spurious information of the slant axis is, in certain cases, contradictory to that for suppressing spurious information of the horizontal or vertical axis.

The above potential contradiction is associated with a material problem in a color TV camera using a solid-state image sensor. According to the prior art spatial frequency filter, except for four cross-points of the four trap lines, the MTF has the absolute value of the product of a cosine function having a given frequency and another cosine function having another given frequency (cf. solid lines in FIGS. 3 to 5). From this, even though the signal reduction rate just on the trap lines is sufficient (e.g., points at 1/Py, −1/Py in FIG. 3), the signal reduction rate near the respective trap lines is not sufficient. Therefore, when the prior art spatial frequency filter is employed for a color TV camera, color spurious information which slightly avoids the trap lines is involved in a color video signal, resulting in the appearance of a spurious color image on a color display.

SUMMARY OF THE INVENTION

It is accordingly an object of the present invention to provide a spatial frequency filter which satisfies the requirements for suppressing spurious information of the slant and horizontal (or vertical) axes of a two-dimensional image sensor.

Another object of the invention is to provide a color TV camera utilizing a two-dimensional solid-state image sensor with the above spatial frequency filter, which substantially avoids a color spurious image caused by spurious information near trap lines of the spatial frequency filter.

Assume that an x-axis spatial frequency of a two-dimensional X-Y plane of the image sensor is denoted by $\omega x$, a y-axis spatial frequency of the X-Y plane is denoted by $\omega y$, a first quadrant of the $\omega x$-$\omega y$ plane is denoted by A1, a second quadrant of the $\omega x$-$\omega y$ plane is denoted by A2, a third quadrant of the $\omega x$-$\omega y$ plane is denoted by A3, a fourth quadrant of the $\omega x$-$\omega y$ plane is denoted by A4, a first prescribed point in the first quadrant A1 is denoted by P1, a second prescribed point in the second quadrant A2 is denoted by P2, a third prescribed point in the third quadrant A3 is denoted by P3 and a fourth prescribed point in the fourth quadrant A4 is denoted by P4.

Then, to achieve the object of the present invention, the spatial frequency filter of the invention includes:

primary filter means (S1, S2 in FIG. 6) for providing a first trap line (4a in FIG. 2) passing through the first prescribed point P1 and a second trap line (4b) passing through the third prescribed point P3;

secondary filter means (S3, S4) for providing a third trap line (3a) passing through the second prescribed point P2 and a fourth trap line (3b) passing through the fourth prescribed point P4; and tertiary filter means (S5) for providing a fifth trap line (5a) passing through the first and fourth prescribed points P1, P4 and a sixth trap line (5b) passing through the second and third prescribed points P2, P3.

According to the spatial frequency filter having the above configuration, the first to fourth trap lines (3a, 3b, 4a, 4b in FIG. 2) serve to effectively suppress spurious information of slant axes (e.g., ωs in FIG. 2) of the ωx-ωy plane, and the fifth and the sixth trap lines (5a, 5b), together with the first to the fourth trap lines (3a, 3b, 4a, 4b), serve to effectively suppress spurious information of a horizontal axis (ωx axis) of the ωx-ωy plane.

Similarly, if the fifth trap line of the tertiary filter means (S5) passes through the first and second prescribed points P1, P2 and the sixth trap line thereof passes through the third and fourth prescribed points P3, P4, the fifth and the sixth trap lines serve to suppress spurious information of a vertical axis (ωy axis) of the ωx-ωy plane.

When the tertiary filter means (S12, S40 in FIG. 17) provides a fifth trap line (6a in FIG. 20) passing through a fifth prescribed point P10 in the first quadrant A1 and a sixth prescribed point P20 in the second quadrant A2, a sixth trap line (6b) passing through a seventh prescribed point P30 in the third quadrant A3 and an eighth prescribed point P40 in the fourth quadrant A4, a seventh trap line (7a) passing through the fifth and eighth prescribed points P10, P40 and an eighth trap line (7b) passing through the sixth and seventh prescribed points P20, P30, the fifth and sixth trap lines (6a, 6b) serve to suppress spurious information of the vertical axis of the ωx-ωy plane, and the seventh and eighth trap lines (7a, 7b) serve to suppress spurious information of the horizontal axis thereof.

To achieve the latter object, the spatial frequency filter of the present invention is adapted to a two-dimensional image sensor of a color TV camera.

According to the present invention, the MTF of the image sensor near the respective cross-points of trap lines (3a, 3b, 4a, 4b, 5a and 5b in FIG. 2) of the spatial frequency filter becomes a square-cosine function (cf. broken lines in FIGS. 3 to 5). From this, a sufficient signal reduction rate can be obtained around the respective trap lines. Therefore, when a spatial frequency filter of the present invention is applied to a color TV camera, little color spurious information is involved in a color video signal, thereby substantially avoiding a color spurious image appearing in a color display.

BRIEF DESCRIPTION OF THE DRAWINGS

FIG. 1 shows an arrangement of a color mosaic filter which is adapted to a solid-state color TV camera using a frame integration frequency interleaving method;

FIG. 2 illustrates typical trap lines appearing on the ωx-ωy plane of a two-dimensional spatial frequency filter according to the present invention;

FIG. 7 illustrates polarization characteristics of the first part (S1, S2) of the spatial frequency filter in FIG. 6;

FIG. 8 illustrates polarization characteristics of the second part (S3, S4) of the spatial frequency filter in FIG. 6;

FIG. 9 illustrates a polarization characteristic of the third part (S5) of the spatial frequency filter in FIG. 6;

FIG. 10 shows another embodiment of a two-dimensional spatial frequency filter according to the present invention, which is formed with a first part (S11), second part (S12) and third part (S13) of Savart plates to obtain the trap lines in FIG. 2;

FIG. 11 illustrates polarization characteristics of the first to third parts (S11, S12, S13) of the spatial frequency filter in FIG. 10;

FIGS. 15 and 16 illustrate other examples of polarization characteristics of the spatial frequency filter in FIG. 10 or 12;

FIG. 17 shows still another embodiment of a two-dimensional spatial frequency filter according to the present invention, which is formed with a first part (S40), second part (S11), third part (S12) and fourth part (S13) of Savart plates;

FIG. 18 illustrates polarization characteristics of the first to fourth parts (S40, S11, S12, S13) of the spatial frequency filter in FIG. 17;

FIG. 19 illustrates other polarization characteristics of the first to fourth parts (S40, S11, S12, S13) of the spatial frequency filter in FIG. 17;

FIG. 20 illustrates typical trap lines appearing on the ωx-ωy plane of a two-dimensional spatial frequency filter having the characteristics shown in FIG. 18 or FIG. 19;

FIGS. 21, 22, 31 and 32 show other modifications of the filter arrangement shown in FIG. 1, wherein a field integration frequency interleaving method is applied;

FIGS. 23 to 26 respectively show modifications of the filter arrangement shown in FIG. 1, wherein a frame integration frequency interleaving method is applied;

FIGS. 27 to 30 show other modifications of the filter arrangement shown in FIG. 1, wherein a field integration line sequential color differential method is applied;

FIG. 36 shows another embodiment of the present invention, which includes a color filter S41 combined with the spatial frequency filter of, e.g., FIG. 17.

DETAILED DESCRIPTION OF THE PREFERRED EMBODIMENTS

Figure 3:
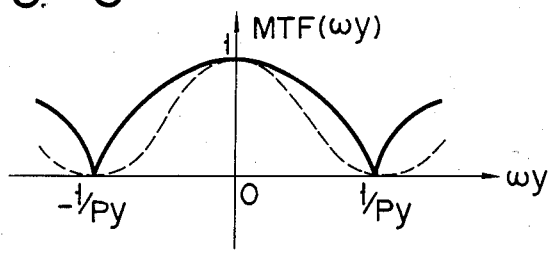
FIG. 3 shows a modulation transfer function (MTF) of the spatial frequency filter along the vertical ωy axis of the ωx-ωy plane in FIG. 2, wherein the solid line indicates the MTF(ωy) of a conventional spatial frequency filter and the broken line indicates the MTF(ωy) of the spatial frequency filter of the invention.

Hereinafter, preferred embodiments of the invention will be described in detail with reference to the accompanying drawings. In the following description, the same or similar elements are denoted by the same or similar reference numerals throughout the drawings, thereby avoiding redundant explanations.

Figures 1, 2:
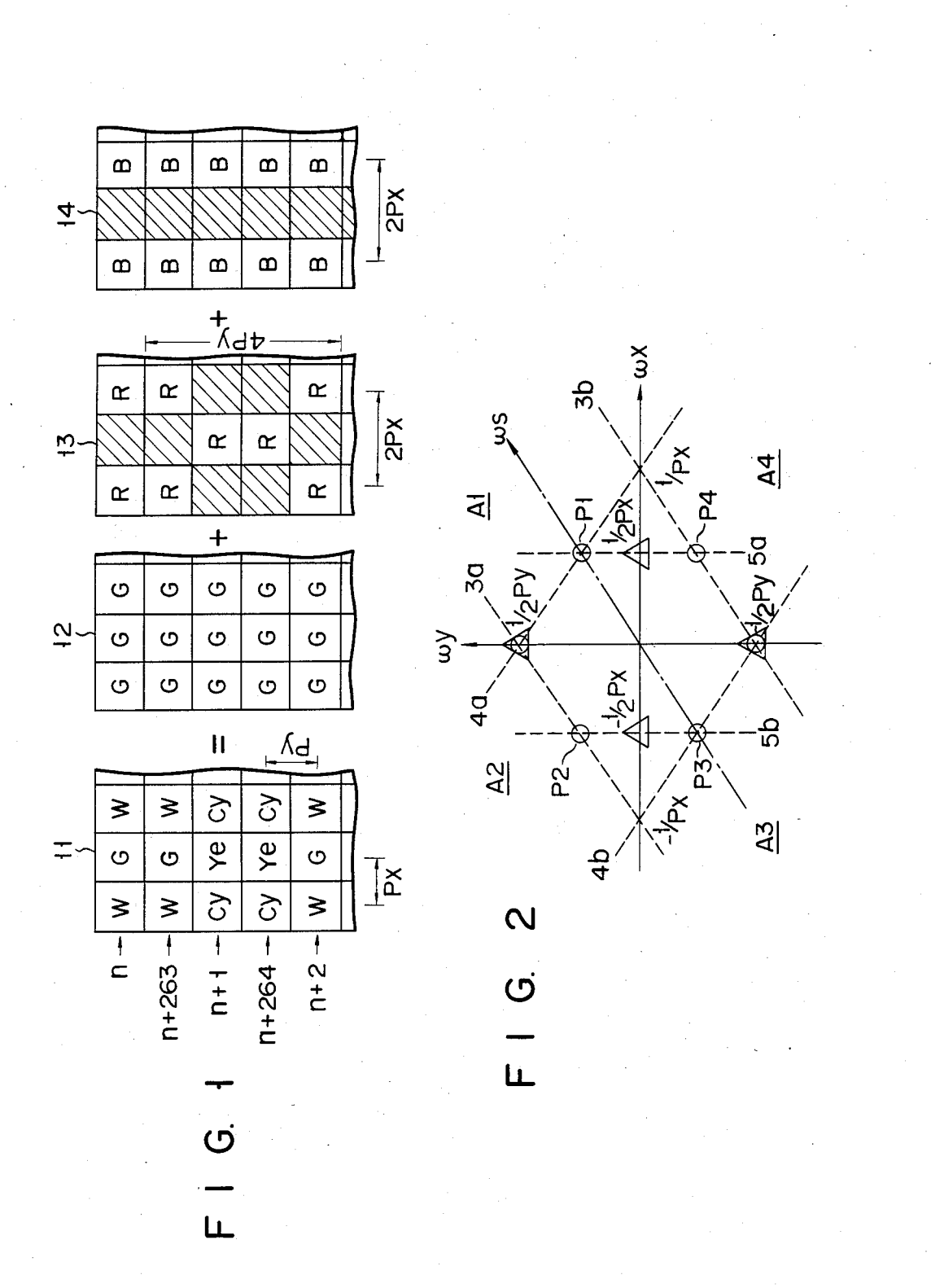

FIG. 1 shows an arrangement of a color mosaic filter which is adapted to a two-dimensional solid-state image sensor for a color TV camera. This arrangement is adapted to a frame integration frequency interleaving method.

Although not shown, a two-dimensional solid-state image sensor such as a CCD image sensor comprises numerous photo-sensitive portions with given apertures for respective pixels. These photo-sensitive portions are discretely but regularly arranged on the two-dimensional spatial region of the image sensor, and video information is obtained by spatial sampling of the image sensor. According to such spatial sampling, the upper limit of the frequency of the obtained video information is restricted by a Nyquist frequency (corresponding to half of the sampling frequency), and the spatial frequency response (corresponding to MTF) at the Nyquist frequency depends on the aperture of the photo-sensitive portions. Further, the obtained video information involves spurious components due to the alias. In particular, when a single chip image sensor with a color mosaic filter is used as in the case of a home-use video camera, complex spurious signals are caused not only by an alias due to the pitch of pixels but also by an alias due to the sampling of color information.

The present invention is intended to provide a spatial frequency filter which optically reduces the influence of the pixel pitch alias as well as the influence of the alias with respect to two color signals (R, B).

FIG. 1 shows an arrangement 11 of pixels in a color mosaic filter which may be adapted to a CCD color TV camera using a frame integration frequency interleaving method. In FIG. 1, symbols, W, G, Ye and Cy respectively define:

W—transmitted light of white
G—transmitted light of green
Ye—transmitted light of yellow
Cy—transmitted light of cyan.

Here, W corresponds to the sum of R (red), G (green) and B (blue), i.e., the three primary colors. When arrangement 11 of the color mosaic filter is decomposed by the three primary colors, it becomes equivalent to the combination of decomposed filter arrangements 12, 13 and 14. As may be seen from the illustration of FIG. 1, the R filter pattern is phase-inverted between adjacent horizontal lines (n, n+1, n+2; or n+263, n+264), while the phase of the B filter pattern is fixed. From such filter arrangements, with the adding/subtracting operation of video signals from the image sensor by means of a comb filter having a 1H delay circuit, R and B color signals can be separated.

In FIG. 1, a symbol Px defines the pitch of pixels along an x (horizontal) axis of the filter plane, and a symbol Py defines the pitch of pixels along a y (vertical) axis of the filter plane. The Nyquist limit of the horizontal direction in the filter plane is defined by $\frac{1}{2}$Px, and the Nyquist limit of the vertical direction in the filter plane is defined by $\frac{1}{2}$Py. Higher spatial frequency components exceeding the Nyquist limit are folded back to lower frequency regions.

FIG. 2 illustrates typical trap lines appearing on the $\omega x$-$\omega y$ plane of a two-dimensional spatial frequency filter according to the present invention. Zero beat points among the folding back components and the signal components below the Nyquist limit appear at spatial frequency points $\pm 1/Px$ and $\pm 1/Py$. At each of the zero beat points, the magnitude of a spurious signal becomes maximum. If this spurious signal is not sufficiently suppressed, a luminance signal obtained from the image sensor is largely affected by this spurious signal. For a color signal, when correlative processing is affected on video signals obtained from a repetitive pitch arrangement of 2×2 pixels, the zero beat appears at a spatial frequency point below the spatial frequency point of the luminance signal.

As shown in FIG. 1, since the sampling pitch of the B color signal is 2Px, the zero beat points of the B color signal appears at spatial frequency points $\pm \frac{1}{4}$Px. From this, if no filtering is effected on these B color zero beat points, a large spurious signal of the B color (or spurious signal of the complementary color of B) is involved in the obtained color signal. With respect to the vertical (y axis) direction, a 2-line correlation is effected. In this case, resolution of the vertical direction becomes half of the resolution of the luminance signal. The zero beat points of the vertical direction appear at $\pm \frac{1}{4}$Py. The above zero beat points of $\pm \frac{1}{4}$Px and $\pm \frac{1}{4}$Py are indicated by triangular marks in FIG. 2.

As illustrated in FIG. 1, pattern arrangement 13 of the R color signal has a checkered or plaid pattern with periods of 2Px and 4Py. According to such a checkered pattern, resolution of the video signal with respect to the slant direction of the filter plane is degraded, and the zero beat points of this R color signal appear at $\pm \frac{1}{4}$Px, $\pm \frac{1}{4}$Py (points P1 to P4 in FIG. 2). From this, if no filtering is effected on these R color zero beat points, a large spurious signal of the R color (or spurious signal of the complementary color of R) is involved in the obtained color signal.

According to the filter arrangement of FIG. 1, the zero beat points of R and B signals with respect to the vertical direction appear at $\pm \frac{1}{4}$Py on the spatial frequency axis $\omega y$ because a 2-line correlation is applied to the processing of the two (R, B) color signals. These zero beat points of R and B signals are identical to the half of zero beat points $\pm 1/Py$ of the luminance signal.

The spurious signal of the zero beat points caused by the alias can be reduced or substantially eliminated by means of a spatial frequency filter of the present invention.

Figure 6:
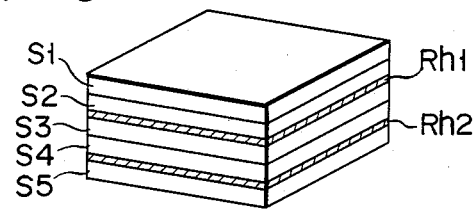
FIG. 6 shows an embodiment of a two-dimensional spatial frequency filter according to the present invention, which is formed with a first part (S1, S2) of Savart plates, a second part (S3, S4) of Savart plates and a third part (S5) of a Savart plate, thereby obtaining the trap lines in FIG. 2.

FIG. 6 shows an embodiment of a two-dimensional spatial frequency filter according to the present invention. This filter is formed with Savart plates S1 and S2 (first part), Savart plates S3 and S4 (second part) and a Savart plate S5 (third part). The first part of plates S1 and S2 is optically insulated by a depolarization filter Rh1 from the second part of plates S3 and S4. The second part of plates S3 and S4 is similarly optically insulated by a depolarization filter Rh2 from the third part of plate S5. Each of the depolarization filters Rh1 and Rh2 serves to eliminate optical interferences between the adjacent Savart plates. When depolarization filters Rh1 and Rh2 are employed, the stacking order of the first to third part of the Savart plates S1 to S5 may be optional. The spatial frequency filter thus obtained can be regarded as an optical comb filter.

FIG. 7 illustrates polarization characteristics of the first part of Savart plates S1 and S2 of the spatial frequency filter in FIG. 6. In FIG. 7, the illustration of S1+S2 represents the combination of the characteristics of two Savart plates S1 and S2. FIG. 8 illustrates polarization characteristics of the second part of Savart plates S3 and S4. In FIG. 8, the illustration of S3+S4 represents the combination of the characteristics of two Savart plates S3 and S4. FIG. 9 illustrates a polarization characteristic of the third part of Savart plate S5. The total optical filtering characteristic of the spatial frequency filter in FIG. 6 is obtained by convolving respective transfer functions of the first to third part of the Savart plates S1 to S5.

The filtering characteristic of the spatial frequency filter in FIG. 6 may be as shown in FIG. 2. In the illustration of FIG. 2, the trap line 4a passing through points ½Py and 1/Px and the trap line 4b passing through points −1/Px and −½Py are obtained by the first part of Savart plates S1 and S2. The trap line 3a passing through points ½Py and −1/Px and the trap line 3b passing through points 1/Px and −½Py are obtained by the second part of Savart plates S3 and S4. The trap line 5a passing through point ½Px and the trap line 5b passing through point −½Px, each of the trap lines 5a and 5b being parallel along the ωy axis, are obtained by the third part of Savart plate S5.

The filtering characteristic of the FIG. 6 filter can be optionally determined by a proper selection of the material and thickness for the respective Savart plates S1 to S5. In the embodiment of FIG. 6, the material and thickness of Savart plates S1 to S4 are selected such that the trap points ±1/Px in FIG. 2 correspond to the horizontal pixel transmission frequency (e.g., 7.16 MHz) of the image sensor and such that the trap points ±½Py in FIG. 2 correspond to the color carrier frequency (e.g., 3.18 MHz) thereof. The material and thickness of Savart plate S5 are selected such that the trap points ±½Px in FIG. 2 correspond to half of the horizontal pixel transmission frequency of the image sensor. When the filter of FIGS. 1 and 6 are combined, it is preferable that the trap line (or the null point of MTF=0) passes through the zero beat point of red information with respect to the slant direction.

Assume that the first quadrant of the ωx-ωy plane of FIG. 2 is denoted by A1, the second quadrant thereof is denoted by A2, the third quadrant thereof is denoted by A3 and the fourth quadrant thereof is denoted by A4. Further, assume that the cross point (first prescribed point) between trap lines 4a and 5a in the first quadrant A1 is denoted by P1, the cross point (second prescribed point) between trap lines 3a and 5b in the second quadrant A2 is denoted by P2, the cross point (third prescribed point) between trap lines 4b and 5b in the third quadrant A3 is denoted by P3 and the cross point (fourth prescribed point) between trap lines 3b and 5a in the fourth quadrant A4 is denoted by P4. It is further assumed that color spurious signals due to the alias appear at the above points P1 to P4.

The spatial frequency filter of FIG. 6 is essentially formed with a primary filter portion (S1, S2) for providing a first trap line (4a) passing through first prescribed point P1 and a second trap line (4b) passing through third prescribed point P3, a secondary filter portion (S3, S4) for providing a third trap line (3a) passing through second prescribed point P2 and a fourth trap line (3b) passing through fourth prescribed point P4, and a tertiary filter portion (S5) for providing a fifth trap line (5a) passing through first and fourth prescribed points P1, P4 and a sixth trap line (5b) passing through second and third prescribed points P2, P3.

In the following, the modulation transfer function (MTF) of the spatial frequency filter as shown in FIG. 6 and the MTF of a conventional spatial frequency filter as mentioned in the description of the background art (which provides trap lines forming a rectangular figure) will be compared. Here, the MTF of a horizontal ωx axis, the MTF of a vertical ωy axis and the MTF of a slant ωs axis are used for the comparison.

(1) Prior Art Spatial Frequency Filter having Trap Lines of Rectangular Figure $$MTF1(\omega x) = \cos(\pi \cdot Px \cdot \omega x) \cdot \cos(\pi/2 \cdot Px \cdot \omega x)$$
$$MTF2(\omega y) = \cos(\pi \cdot Py \cdot \omega y)$$
$$MTF3(\omega s) = \cos([\pi \sqrt{Px^2 + 4Py^2}]\omega s/8PxPy) \times \cos([\pi \sqrt{Px^2 + 4Py^2}]\omega s/4PxPy)$$

(2) Spatial Frequency Filter of the Invention having Trap Lines 3a, 3b, 4a, 4b, 5a and 5b as shown in FIG. 2

$$MTF4(\omega x) = \cos(\pi \cdot Px \cdot \omega x) \cdot \cos^2(\pi/2 \cdot Px \cdot \omega x)$$
$$MTF5(\omega y) = \cos^2(\pi \cdot Py \cdot \omega y)$$
$$MTF6(\omega s) = \cos^2([\pi \sqrt{Px^2 + 4Py^2}]\omega s/8PxPy)$$

Figure 5:
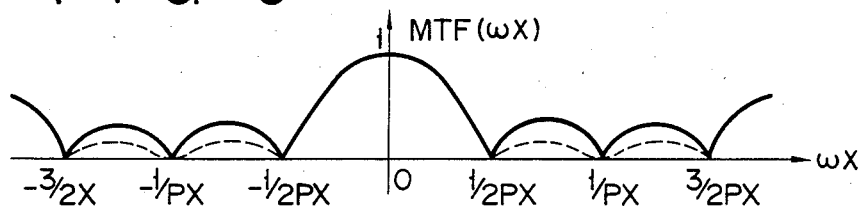
FIG. 5 shows an MTF of the spatial frequency filter along the horizontal ωx axis of the ωx-ωy plane in FIG. 2, wherein the solid line indicates the MTF(ωx) of a conventional spatial frequency filter and the broken line indicates the MTF(ωx) of the spatial frequency filter of the invention.

MTF1(ωx) is illustrated by the solid line in FIG. 5, and

MTF4(ωx) is illustrated by the broken line in FIG. 5.

MTF2(ωy) is illustrated by the solid line in FIG. 3, and

MTF5(ωy) is illustrated by the broken line in FIG. 3.

Figure 4:
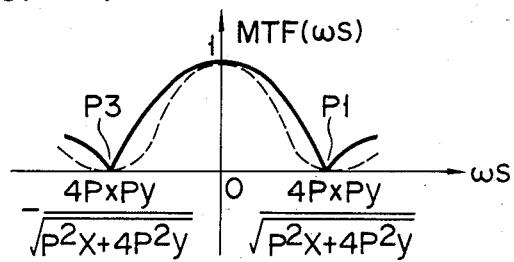
FIG. 4 shows an MTF of the spatial frequency filter along the slant ws axis of the ωx-ωy plane in FIG. 2, wherein the solid line indicates the MTF(ωs) of a conventional spatial frequency filter and the broken line indicates the MTF(ωs) of the spatial frequency filter of the invention.

MTF3(ωs) is illustrated by the solid line in FIG. 4, and

MTF6(ωs) is illustrated by the broken line in FIG. 4.

As may be seen from the broken lines in FIGS. 3 to 5, since the MTF of the spatial frequency filter of the invention has a function of the square cosine, a spurious signal reduction rate around the respective trap lines is prominently improved in comparison with the MTF of the prior art spatial frequency filter. From this, when the spatial frequency filter of this invention is adapted to a color TV camera, even a color spurious component which slightly deviates from the trap lines is effectively suppressed, and a pure color video signal being free from color spurious signals can be obtained. (The improvement in the spurious reduction rate is roughly 6 dB with respect to the peak amplitude of the spurious signal which avoids the trap line; cf. the solid and broken lines in FIG. 5.) In addition, no substantial signal reduction is involved within a luminance signal frequency band (see within the range between ±1/Py in FIG. 3 or between ±½Px in FIG. 5, for example).

Further, since parallel trap lines 5a and 5b are combined with the trap lines 3a, 3b, 4a and 4b which form a rhombic figure, the spatial frequency filter of FIG. 6 satisfies the requirement not only for suppressing spurious information of slant axis ωs but also for suppressing spurious information of horizontal axis ωx.

FIG. 10 shows another embodiment of a two-dimensional spatial frequency filter according to the present invention. The FIG. 10 filter is formed with first (S11), second (S12) and third (S13) Savart plates to obtain the trap lines as shown in FIG. 2.

FIG. 11 illustrates polarization characteristics of the first to third Savart plates (S11, S12, S13) of the spatial frequency filter shown in FIG. 10. As seen from FIG. 11, the polarizing axis of Savart plate S12 is parallel to the horizontal axis of the two-dimensional image sensor plane. The polarizing axes of Savart plates S11 and S13 incline by −45 and −135 degrees, respectively, with respect to the horizontal axis. When the absolute value of the polarizing axis incline angle of each of Savart plates S11 and S13 is selected to be substantially 45 degrees and the difference between the incline angles of Savart plates S11 and S13 is substantially 90 degrees, depolarization filters Rh1 and Rh2 as shown in FIG. 6 may be omitted. The key point of the Savart plate stacking arrangement of FIG. 10 is that plate S12 having the horizontal polarizing axis is sandwiched between plate S11 having the −45 degrees inclined polarizing axis and plate S13 having the −135 degrees inclined polarizing axis.

Incidentally, it is well known to a person skilled in the art that only if the polarizing direction of one Savart plate is deviated by 45 degrees from that of another adjacent Savart plate are the optical characteristics of the two adjacent Savart plates convolved. When a trap of a specific polarizing direction other than 45 degrees is required, a polarization characteristics combination method as shown in FIG. 7 or 8 is employed.

Figure 12:
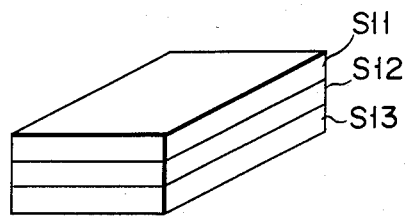
FIG. 12 shows a modification of the FIG. 10 embodiment.
Figure 13:
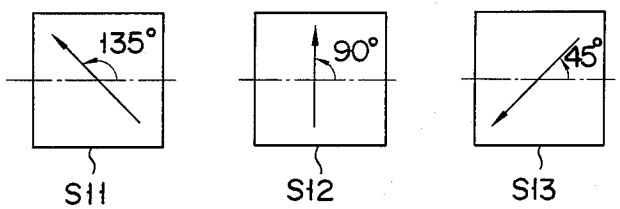
FIG. 13 illustrates polarization characteristics of the spatial frequency filter in FIG. 12.

FIG. 12 shows a modification of the spatial frequency filter shown in FIG. 10. Respective Savart plates S11, S12 and S13 constituting the filter of FIG. 12 may have polarization characteristics as shown in FIG. 13. The FIG. 12 filter has a trap pattern as shown by the broken lines in FIG. 14.

Figure 14:
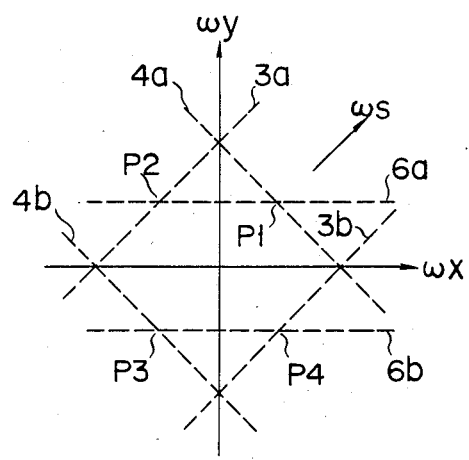
FIG. 14 illustrates typical trap lines appearing on the ωx-ωy plane of a two-dimensional spatial frequency filter having the characteristics shown in FIG. 13.

As may be seen from FIG. 14, according to the FIG. 12 filter, the cut-off frequency (which is defined by the broken lines in FIG. 14) of the optical low pass filter for horizontal axis ωx is higher than that for slant axis ωs. From this, a sufficiently wide range frequency response for video information of the horizontal axis is ensured so that the resolution of the horizontal axis video information is not deteriorated by the optical filtering of the spatial frequency filter. On the other hand, a frequency response range for video information of the slant axis is made relatively narrow so as to effectively reduce a spurious signal of the slant axis. Such a relatively narrow frequency response range for the slant axis provides no practical inconvenience because the resolution of the human eye for the slant direction is lower than that of the horizontal direction.

FIGS. 15 and 16 respectively show other examples of polarization characteristics of the spatial frequency filter as shown in FIG. 10 or 12.

FIG. 17 shows another embodiment of a two-dimensional spatial frequency filter according to the present invention. The FIG. 17 filter is formed with a first Savart plate (S40), second Savart plate (S11), third Savart plate (S12) and fourth Savart plate (S13). The key feature of the FIG. 17 embodiment, which is not contained in the embodiment of FIGS. 6, 10 or 12, resides in the additional use of Savart plate S40. The polarization characteristics of the FIG. 17 filter may be one as shown in FIG. 18 or 19. When the spatial frequency filter has such polarization characteristics, the trap lines of the filter may be as shown in FIG. 20. Incidentally, depolarization filters (Rh) as shown in FIG. 6 may be applied to the filter of FIG. 17.

FIGS. 21 to 28 respectively show modifications of the filter arrangement shown in FIG. 1, wherein a frame integration frequency interleaving method is applied. In these figures, n denotes the number of horizontal scannings, G denotes green, Cy denotes cyan, Ye denotes yellow and W denotes white.

According to the filter arrangement of FIG. 23, when $W=R+G+B$, $Ye=R+G$ and $Cy=B+G$, the pattern of R becomes striped (similar to the B pattern arrangement 14 in FIG. 1), and the pattern of B becomes checkered (similar to the R pattern arrangement 13 in FIG. 1).

According to the filter arrangement of FIG. 24, the pattern of B becomes striped, and the pattern of R becomes checkered.

According to the filter arrangement of FIG. 25, the pattern of R and B is phase-inverted along the horizontal scanning line for each continuous field. In each field, the pattern of R becomes striped, and the pattern of B becomes checkered.

According to the filter arrangement of FIG. 26, the pattern of R and B is phase-inverted along the horizontal scanning line for each continuous field. In each field, the pattern of B becomes striped, and the pattern of R becomes checkered.

According to the filter arrangement of FIG. 27, the pattern of Ye and Cy becomes striped, and the pattern of W becomes checkered.

According to the filter arrangement of FIG. 28, the pattern of Ye and Cy becomes striped, and the pattern of W and G becomes checkered.

FIGS. 29 and 30 show other modifications of the filter arrangement shown in FIG. 1, wherein a field integration line sequential color differential method is applied. In these figures, n denotes the number of horizontal scannings of an A field, n* denotes the number of horizontal scannings of a B field and M denotes magenta.

According to the filter arrangement of FIG., 29, the pattern of Cy and Ye becomes striped and the pattern of M and G becomes checkered.

According to the filter arrangement of FIG. 30, the pattern of M and G becomes striped and the pattern of Cy and Ye becomes checkered.

FIGS. 31 and 32 show other modifications of the filter arrangement shown in FIG. 1, wherein a field integration frequency interleaving method is applied. Here, a pair of two color filter segments along the vertical direction constitute one picture element. In these figures, the picture element pairs are partly exemplified by first to fourth pels.

According to the filter arrangement of FIG. 31, when the first pel = $W+W$, the second pel = $Ye+Cy$, the third pel = $W+Cy$ and the fourth pel = $Ye+W$, the pattern of Ye becomes striped, and the pattern of Cy becomes checkered. The pattern of W may be either striped or checkered.

According to the filter arrangement of FIG. 32, the pattern of Cy becomes striped, and the pattern of Ye becomes checkered. The pattern of G may be either striped or checkered.

Figure 33:
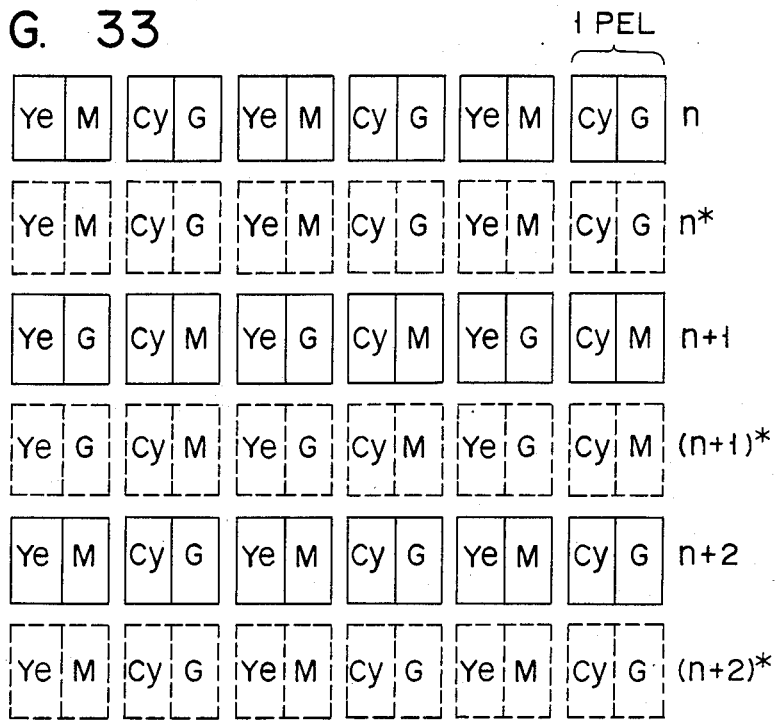
FIGS. 33 and 34 show other modifications of the filter arrangement shown in FIG. 1, wherein a frame integration line sequential color differential method is applied.
Figure 34:
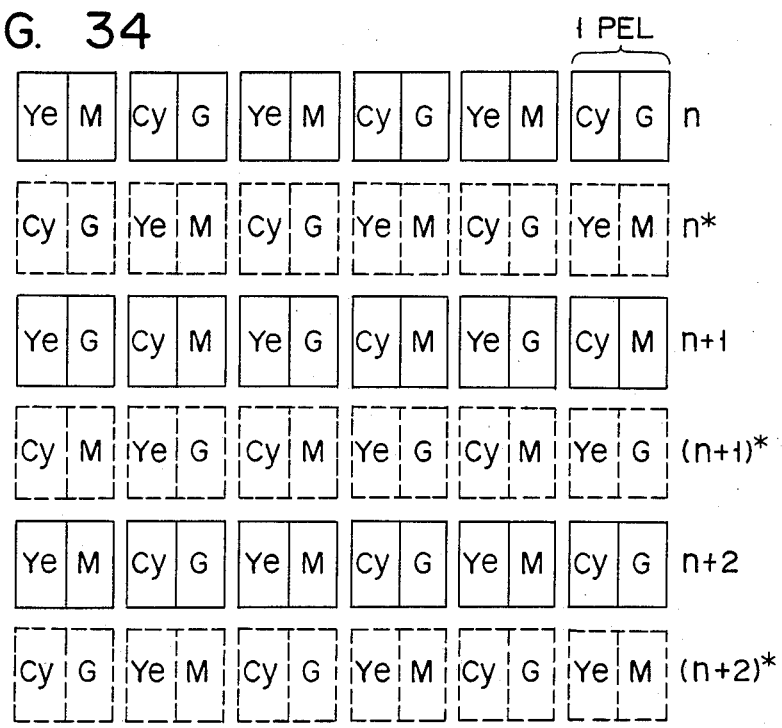

FIGS. 33 and 34 show other modifications of the filter arrangement shown in FIG. 1, wherein a frame integration line sequential color differential method is applied. Here, a pair of two color filter segments along the horizontal direction constitute one picture element.

According to the filter arrangement of FIG. 33, the pattern of Ye and Cy becomes striped, and the pattern of M and G becomes checkered.

According to the filter arrangement of FIG. 34, the pattern of Ye, M, Cy and G is phase-inverted along the horizontal scanning line for each continuous field. In each field, the pattern of Ye and Cy becomes striped, and the pattern of M and G becomes checkered.

Figure 35:
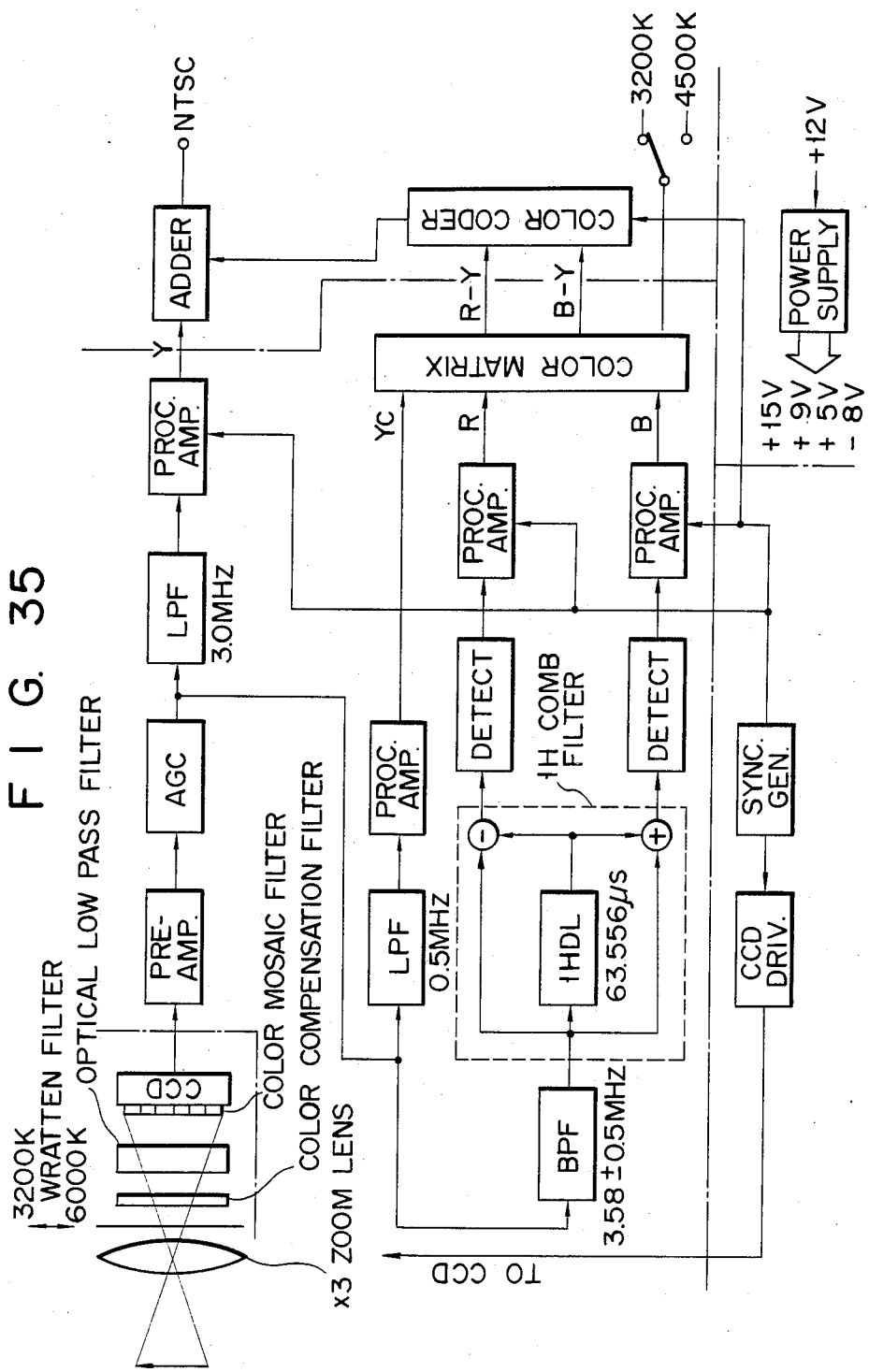
FIG. 35 shows a block diagram of a CCD color TV camera to which a spatial frequency filter (optical low pass filter) of the invention is adapted.

FIG. 35 shows a block diagram of a CCD color TV camera which employs a field integration frequency interleaving method. The spatial frequency filter as shown in FIGS. 6, 10, 12 or 17 may be used for the optical low pass filter in FIG. 35. The color compensating filter may also be stacked onto an opitcal low pass filter of the type shown in FIGS. 6, 10, 12 or 17 as shown in FIG. 36, wherein S41 represents the color compensating filter. Since the configuration of the TV camera shown in FIG. 35 is conventional, no further description will be given of FIG. 35.

Finally, the following prior art publications are incorporated in the present application for the purpose of supporting the disclosure.

(1) Yoshinori TAKIZAWA et al.; "Field Integration Mode CCD Color Television Camera using a Frequency Interleaving Method", IEEE Trans., CE-29, No. 3, pp. 358–363 (August, 1983)

(2) D. H. Seib: "Carrier Diffusion Degradation of Modulation Transfer Function in Charge Coupled Imager", IEEE Trans., ED-21, No. 3, pp. 210–217 (March, 1974)

(3) S. G. Clamberlain et al.: "MTF Simulation including Transmittance Effects and Experimental Results of Charge Coupled Imagers", IEEE Trans., ED-25, No. 2, pp. 145–154 (February, 1978)

(4) J. D. Gaskill: "Linear Systems, Fourier Transforms, and Optics", pp. 290–348, John Wiley & Sons, Inc. (1978)

(5) Japanese Patent Disclosure No. 57-203389 (Dec. 13, 1982)

(6) Japanese Patent Disclosure No. 59-279 (Jan. 5, 1984)

While the invention has been described in connection with what is presently considered to be the most practical and preferred embodiment, it is understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A spatial frequency filter having a two-dimensional spatial frequency plane whose first quadrant includes a first prescribed point, whose second quadrant includes a second prescribed point, whose third quadrant includes a third prescribed point and whose fourth quadrant includes a fourth prescribed point, said two-dimensional spatial frequency plane having a vertical axis and a horizontal axis, said spatial frequency filter comprising:

primary filter means for providing a first trap line passing through said first prescribed point and a second trap line passing through said third prescribed point;

secondary filter means for providing a third trap line passing through said second prescribed point and a fourth trap line passing through said fourth prescribed point; and tertiary filter means for providing a fifth trap line passing through said first and fourth prescribed points and a sixth trap line passing through said second and third prescribed points, wherein each of said first to fourth trap lines crosses over said vertical and horizontal axes so as to form a rhombic trap pattern, and a modulation transfer function of the image sensor becomes substantially zero on the respective trap lines.

2. A spatial frequency filter according to claim 1, wherein said first and third trap lines cross each other at a first vertical axis point, and said second and fourth trap lines cross each other at a second vertical axis point.

3. A spatial frequency filter according to claim 2, wherein said first and fourth trap lines cross each other at a first horizontal axis point, and said second and third trap lines cross each other at a second horizontal axis point.

4. A spatial frequency filter according to claim 3, wherein said fifth trap line crosses said horizontal axis at a third horizontal axis point, said sixth trap line crosses said horizontal axis at a fourth horizontal axis point, and the spatial frequency at said third horizontal axis point equal half of the spatial frequency at said first horizontal axis point.

5. A spatial frequency filter according to claim 4, wherein the spatial frequency at said fourth horizontal axis point equals half of the spatial frequency at said second horizontal axis point.

6. A spatial frequency filter according to claim 5, wherein the spatial frequency at said first vertical axis point equals the spatial frequency at said third horizontal axis point.

7. A spatial frequency filter according to claim 1, wherein said tertiary filter means is formed with a birefringent plate having a polarizing axis which is parallel to said horizontal axis.

8. A spatial frequency filter according to claim 9, wherein said primary filter means is formed with one or more birefringent plates having a polarizing axis which is inclined by a given degree from the polarizing axis of the birefringent plate of said tertiary filter means.

9. A spatial frequency filter according to claim 10, wherein said secondary filter means is formed with one or more birefringent plates having a polarizing axis which is inclined by another given degree from the polarizing axis of the birefringent plate of said primary filter means.

10. A spatial frequency filter according to claim 11, wherein said primary, secondary and tertiary filter means are optically insulated from one another by means of a depolarization element.

11. A spatial frequency filter according to claim 11, wherein the polarizing axis of said primary filter means is inclined by substantially 45 degrees from the polarizing axis of said tertiary filter means, the polarizing axis of said secondary filter means is inclined by substantially 90 degrees from the polarizing axis of said primary filter means, and said tertiary filter means is sandwiched between said primary filter means and said secondary filter means.

12. A spatial frequency filter according to claim 11, further comprising an additional birefringent plate having a polarizing axis which is inclined by substantially 90 degrees from the polarizing axis of said tertiary filter means.

13. A spatial frequency filter according to claim 1, to which a color filter of a frame integration frequency interleaving method is combined.

14. A spatial frequency filter according to claim 1, to which a color filter of a field integration line sequential color differential method is combined.

15. A spatial frequency filter according to claim 1, to which a color filter of a field integration frequency interleaving method is combined.

16. A spatial frequency filter according to claim 1, to which a color filter of a frame integration line sequential color differential method is combined.

17. A spatial frequency filter according to claim 1, wherein:
said primary filter means comprises a first birefringent plate having a polarizing axis inclined by substantially 45 degrees from said vertical or horizontal axis;
said tertiary filter means comprises a second birefringent plate having a polarizing axis parallel to said vertical or horizontal axis, said second birefringent plate being stacked onto said first birefringent plate; and
said secondary filter means comprises a third birefringent plate having a polarizing axis inclined by substantially 90 degrees from the polarizing axis of said first birefringent plate, said third birefringent plate being stacked onto said second birefringent plate so that the polarizing axis of said third birefringent plate forms a rhombic trap pattern with said polarizing axis of said first birefringent plate.

18. A spatial frequency filter according to claim 17, further comprising:
a fourth birefringent plate having a polarizing axis inclined by substantially 90 degrees from the polarizing axis of said second birefringent plate, said second and fourth birefringent plates sandwiching said third birefringent plate.

19. A spatial frequency filter having a two-dimensional spatial frequency plane whose first quadrant includes a first prescribed point, whose second quadrant includes a second prescribed point, whose third quadrant includes a third prescribed point and whose fourth quadrant includes a fourth prescribed point, said two-dimensional spatial frequency plane having a vertical axis and a horizontal axis, said spatial frequency filter comprising:
primary filter means for providing a first trap line passing through said first prescribed point and a second trap line passing through said third prescribed point;
secondary filter means for providing a third trap line passing through said prescribed point and a fourth trap line passing through said fourth prescribed point; and
tertiary filter means for providing a fifth trap line passing through said first and second prescribed points and a sixth trap line passing through said third and fourth prescribed points,
wherein each of said first to fourth trap lines crosses over said vertical and horizontal axes so as to form a rhombic trap pattern, and a modulation transfer function of the image sensor becomes substantially zero on the respective trap lines.

20. A spatial frequency filter according to claim 19, wherein said tertiary filter means is formed with a birefringent plate having a polarizing axis which is parallel to said vertical axis.

21. A spatial frequency filter having a two-dimensional spatial frequency plane whose first quadrant includes a first prescribed point, whose second quadrant includes a second prescribed point, whose third quadrant includes a third prescribed point and whose fourth quadrant includes a fourth prescribed point, said two-dimensional spatial frequency plane having a vertical axis and a horizontal axis, said spatial frequency filter comprising:
primary filter means for providing a first trap line passing through said first prescribed point and a second trap line passing through said third prescribed point;
secondary filter means for providing a third trap line passing through said second prescribed point and a fourth trap line passing through said fourth prescribed point; and
tertiary filter means for providing a fifth trap line passing through a fifth prescribed point in said first quadrant and a sixth prescribed point in said second quadrant, for providing a sixth trap line passing through a seventh prescribed point in said third quadrant and an eighth prescribed point in said fourth quadrant, for providing a seventh trap line passing through said fifth and eighth prescribed points and an eighth trap line passing through said sixth and seventh prescribed points,
wherein each of said first to fourth trap lines crosses over said vertical and horizontal axes so as to form a rhombic trap pattern, and a modulation transfer function of the image sensor becomes substantially zero on the respective trap lines.

22. A spatial frequency filter having a two-dimensional spatial frequency plane with orthogonal first and second axes, wherein said spatial frequency plane has a first quadrant containing a first prescribed point, a second quadrant containing a second prescribed point, a third quadrant containing a third prescribed point and a fourth quadrant containing a fourth prescribed point, wherein the absolute values of said first to fourth prescribed points with respect to said first axis are substantially the same, and wherein the absolute values of said first to fourth prescribed points with respect to said second axis are substantially the same,
said spatial frequency filter comprising:
a first spatial frequency filter part having two sets of parallel trap lines, said parallel trap lines of one set passing through said first and third prescribed points, respectively, and crossing over said first and second axes, and said parallel trap lines of the other set passing through said second and fourth prescribed points, respectively, and crossing over said first and second axes, said two sets of parallel trap lines thereby forming a rhombic trap pattern; and a second spatial frequency filter part having one set of parallel trap lines which are symmetrical with respect to said first axis and are parallel to said first axis.

23. A spatial frequency filter according to claim 22, further comprising:
a third spatial frequency filter part having one set of parallel trap lines which are symmetrical with respect to said second axis and are parallel to said second axis.

24. A spatial frequency filter according to claim 23, wherein said third spatial frequency filter part includes:
a Savart plate which has a polarizing direction parallel to said first axis.

25. A spatial frequency filter according to claim 22, wherein said first spatial frequency filter part includes:
a pair of Savart plates, one of which has a polarizing direction parallel to said first axis and the other of which has a polarizing direction parallel to said second axis, the total polarizing direction of the pair of said Savart plates being optional, and
wherein said second spatial frequency filter part includes:
Savart plate which has a polarizing direction parallel to said second axis.

26. A spatial frequency filter according to claim 25, further comprising:
a depolarization element sandwiched between said first spatial frequency filter part and said second spatial frequency filter part.

27. A spatial frequency filter according to claim 22, wherein said first spatial frequency filter part includes:
a first Savart plate which has a polarizing direction slanted by substantially 45 degrees from said first axis; and
a second Savart plate which has a polarizing direction slanted by substantially 90 degrees from said first Savart plate, and
wherein said second frequency filter part includes:
a third Savart plate which has a polarizing direction parallel to said second axis, said third Savart plate being directly sandwiched between said first and second Savart plates.

28. A spatial frequency filter according to claim 22, which is adapted to a solid-state image sensor having given spectral sensitivity characteristics for color photographing.

29. A spatial frequency filter according to claim 28, wherein said image sensor has horizontal pixels with a pitch Px, said horizontal pixels are arranged parallel to said second axis, and the absolute value of each of said first to fourth prescribed points with respect to said said second axis is 1.

30. A spatial frequency filter according to claim 29, wherein said image sensor has a horizontal repetition pitch of 2Px with respect to said given spectral sensitivity characteristics.

* * * * *